(12) United States Patent
You et al.

(10) Patent No.: US 11,119,470 B2
(45) Date of Patent: Sep. 14, 2021

(54) INDUSTRIAL ROBOT PROCESS CLOUD SYSTEM AND WORKING METHOD THEREOF

(71) Applicant: EFORT INTELLIGENT EQUIPMENT CO., LTD., Anhui (CN)

(72) Inventors: Wei You, Anhui (CN); Lijin Xu, Anhui (CN)

(73) Assignee: EFORT INTELLIGENT EQUIPMENT CO., LTD., Wuhu (CN)

(*) Notice: Subject to any disclaimer, the term of this patent is extended or adjusted under 35 U.S.C. 154(b) by 758 days.

(21) Appl. No.: 15/744,979

(22) PCT Filed: Aug. 25, 2016

(86) PCT No.: PCT/CN2016/096742
§ 371 (c)(1),
(2) Date: Jan. 15, 2018

(87) PCT Pub. No.: WO2017/063453
PCT Pub. Date: Apr. 20, 2017

(65) Prior Publication Data
US 2018/0210432 A1    Jul. 26, 2018

(30) Foreign Application Priority Data
Oct. 12, 2015    (CN) .......................... 201510662081.6

(51) Int. Cl.
G05B 19/418    (2006.01)
B25J 9/16    (2006.01)
H04L 29/06    (2006.01)

(52) U.S. Cl.
CPC .......... *G05B 19/41855* (2013.01); *B25J 9/16* (2013.01); *B25J 9/161* (2013.01); *B25J 9/163* (2013.01);
(Continued)

(58) Field of Classification Search
None
See application file for complete search history.

(56) References Cited

U.S. PATENT DOCUMENTS 8,830,057 B1    9/2014    Poursohi et al.
2015/0273693 A1    10/2015    Cohen et al.

FOREIGN PATENT DOCUMENTS

CN    101973031 A    2/2011
CN    202795029 U    3/2013
(Continued)

*Primary Examiner* — Carlos R Ortiz Rodriguez
(74) *Attorney, Agent, or Firm* — Bayramoglu Law Offices LLC

(57) ABSTRACT

The present invention relates to an industrial robot process cloud system and a working method thereof. The industrial robot process cloud system comprises an industrial robot control system integrated with a human machine interaction layer HMI, a motion planning control layer Motion and a servo loop control layer Servo, and further comprises a cloud server, wherein the cloud server comprises a process expert system. The human machine interaction layer HMI and the motion planning control layer Motion realize data interaction with the cloud server by means of a network, after the human machine interaction layer HMI inputs operation information, the operation information is transmitted to the cloud server, and a specific robot operation program is generated and downloaded into the industrial robot control system by means of the network. The present invention realizes cloud processing performed to process experiences on various operation types of industrial robots, the process expert system is formed, data interaction and real-time evolution learning of the process expert system are realized by means of the network, the user can conveniently call in real time the robot process program which best satisfies actual requirements and the changeover production efficiency is improved.

20 Claims, 3 Drawing Sheets

(52) U.S. Cl.
CPC .......... *B25J 9/1656* (2013.01); *G05B 19/418* (2013.01); *G05B 19/4183* (2013.01); *G05B 19/4186* (2013.01); *G05B 19/41865* (2013.01); *H04L 29/06* (2013.01); *G05B 2219/31422* (2013.01); *G05B 2219/40383* (2013.01); *Y02P 90/02* (2015.11)

(56) References Cited

FOREIGN PATENT DOCUMENTS

| | | |
|---|---|---|
| CN | 103747024 A | 4/2014 |
| CN | 104656609 A | 5/2015 |
| CN | 104882143 A | 9/2015 |
| CN | 105215987 A | 1/2016 |

INDUSTRIAL ROBOT PROCESS CLOUD SYSTEM AND WORKING METHOD THEREOF

FIELD OF THE INVENTION

The present invention relates to the technical field of industrial robot control and process operation, in particular to an industrial robot process cloud system and a working method thereof.

BACKGROUND OF THE INVENTION

With the continuous revolution and development of industrial robot technology, manual operation is gradually replaced, and production efficiency and product consistency are greatly improved. However, for a traditional industrial robot, when product specifications are changed, changeover production programming efficiency is extremely low, it seriously depends on experiences of robot operators or maintenance engineers from end users, and subsequent cost for operation and maintenance robots is high; a process software packet adopted by the traditional industrial robot is always stored in a controller of the robot itself, thus the hardware resource of the local controller of the industrial robot is occupied. The local hardware resource of the robot cannot perform large-scale acquisition and mining of process data, computation and reasoning of process instructions and storage of a process knowledge database since a hardware bottleneck exists, process intelligence and integrity are poor, simultaneously the relevant process software packet of the robot needs to be periodically updated, is static and cannot be updated in real time, the user cannot use the latest and optimum process knowledge and support, and the timeliness and customer experience are poor; simultaneously the current industrial robot software architecture is complex and cannot be standardized; and a lot of hardware resource is occupied and the cost is high.

SUMMARY OF THE INVENTION

Aiming at the above-mentioned defects in the prior art and current architecture, the present invention provides an industrial robot process cloud system and a working method thereof, so as to solve the defects in the prior art.

An industrial robot process cloud system comprises an industrial robot control system integrated with a human machine interaction layer HMI, a motion planning control layer Motion and a servo loop control layer Servo.

The industrial robot process cloud system further comprises a cloud server, and the cloud server comprises a process expert system. In the present invention, by implementing relevant functions of a process software packet originally used by the traditional industrial robot by means of the process expert system which is stored and operates in the cloud server, the hardware resource of the local control system of the industrial robot is not occupied, the software architecture is simple, the cost is low, and the establishment of the intelligent and dynamic expert system is realized depending on the powerful hardware resource of the cloud server.

The human machine interaction layer HMI and the motion planning control layer Motion realize data interaction with the cloud server by means of a network via a specific data interaction communication protocol, after the human machine interaction layer HMI inputs operation information, the operation information is transmitted to the cloud server, and after the cloud server searches an existing template program in the process expert system or performs similarity comparison and reasoning computation, a specific robot operation program is formed and downloaded into the industrial robot control system by means of the network.

Robot sensors for sensing real-time data of an industrial robot is integrated in the industrial robot control system, the robot sensors comprise motor encoders and current sensors, final operation data during batch operation performed by the industrial robot to workpieces are transmitted to the cloud server, the final operation data also contain bottom servo control layer Servo data, and the cloud server completes optimization, learning and evolution of the process expert system by comparing and learning the original downloaded operation program. The process expert system has real-time continuous learning and perfection functions and can be updated in real time, the user can always obtain the latest process knowledge and support, the timeliness is strong, and simultaneously the hardware resource of the cloud server does not have a bottleneck of the local hardware resource. By adopting the technical solution provided by the present invention, the changeover production programming efficiency of factories can be greatly improved, it does not depend on and is not limited to experiences of industrial robot operation and maintenance personnel and process personnel of the user, and the use cost of the industrial robot is reduced.

The process expert system comprises a welding sub-cloud, a painting sub-cloud, a cutting sub-cloud, a pick and palatizing sub-cloud, an assembly sub-cloud, a gluing sub-cloud and a grinding, polishing and deburring sub-cloud, and the number of sub-clouds can be increased continuously subsequently according to increase of operation types. In the present invention, by storing various types of machining processes in the cloud server and realizing sharing and real-time evolution and learning by means of the network, the user can conveniently call the program which best satisfies actual requirements, and the problem that the changeover production programming efficiency of the traditional industrial robot is low is solved.

The network is a 3G, 4G, 5G or the like mobile communication network or an Ethernet existing in the form of WIFI and physical connection. By adopting a common high-speed mobile communication network or Ethernet, the data interaction requirement of the present invention can be satisfied and the data transmission timeliness is guaranteed.

The present invention defines the process expert system which is based on high-speed network technology, operates in the cloud server and has learning and evolution capabilities as a process cloud, so as to cooperate with other parts of the present invention to form the industrial robot process cloud system.

A working method of the industrial robot process cloud system comprises the following steps:

step 1: acquiring a three-dimensional digital model of a finished product sample piece, inputting the three-dimensional digital model into an industrial robot control system and inputting machining parameters through a human machine interaction layer HMI of an industrial robot;

step 2: the industrial robot control system transmitting relevant data obtained in step 1 to a cloud server by using a specific communication protocol;

step 3: the cloud server downloading an operation program into the industrial robot control system by means of a network;

step 4: after field engineers perform simulation and makes a confirmation, controlling the industrial robot to perform trail production;

step 5: inspecting a sample piece obtained after trial production to make sure that the sample piece satisfies technical requirements;

step 6: performing normal production after the sample piece is inspected as qualified;

step 7: uploading data of the industrial robot entering a normal production process and data collected by a sensor to the cloud server by means of the network; and step 8: comparing an original downloaded robot operation program with a robot operation program for actual normal production in the cloud server, online experts performing correction and supplementation to the process expert system or automatically completing perfection of data and rules of the process expert system by using intelligent algorithms such as deep learning such that the process expert system completes learning and evolution.

In step 1, the three-dimensional digital model of the finished product sample piece may be directly acquired by means of computer-aided design.

In step 1, the three-dimensional digital model of the finished product sample piece may also be acquired by means of three-dimensional scanning.

In step 1, the input process parameters comprise material and workpiece machining process requirements.

In step 1, the machining parameters may be input by adopting a manual input mode through the human machine interaction layer HMI of the industrial robot.

In step 1, workpiece attributes may also be automatically inspected by adopting equipment and instruments, and the machining parameters are input through the human machine interaction layer HMI of the industrial robot.

A mode of automatically inspecting workpiece attributes by adopting equipment and instruments may be a barcode reading inspection mode or an RFID reading inspection mode.

In step 3, the cloud server may generate the operation program according to workpiece information by means of online expert manual intervention and download the operation program into the industrial robot control system, and simultaneously the solution and the operation program are stored in the process expert system.

In step 3, the cloud server may also automatically perform search and computation in the process expert system, judge whether search and computation are converged in real time, and download the operation program into the industrial robot control system by means of the network if search and computation are converged.

In step 3, if data are not converged, the data are manually intervened and adjusted by an online expert, i.e., the automatically searched industrial robot operation program is corrected, to enable the data to be converged.

In step 5, if it is inspected as unqualified, the operation program of the industrial robot is corrected and adjusted by offline engineers.

In step 7, the data of the industrial robot entering the normal production process may be directly uploaded to the cloud server by offline engineers.

In step 7, the data of the industrial robot entering the normal production process and the data collected by the sensor are automatically acquired in real time and are uploaded to the cloud server by means of the network.

The present invention has the following beneficial effects: the present invention adopts cloud storage, cloud computation, big data mining and deep learning and realizes cloud processing performed to process experiences on various operation types of the industrial robot, data interaction and real-time evolution and learning is realized by means of the high-speed mobile communication network or Ethernet, thereby the user can conveniently call in real time the robot process program which best satisfies actual requirements, the changeover production efficiency is greatly improved, a great number of useful industrial robot process experiences are shared, the problem that the traditional industrial robot depends on and is limited to experiences of robot operation or maintenance personnel of the final user is solved, and the technical threshold of industrial robot use and the operation and maintenance cost are effectively reduced; the present invention uses the high-speed network to acquire the operation data of the industrial robot in real time, the online learning and evolution of the process expert system are completed by using data mining, machine learning and cloud computation, thereby the user can be guaranteed to always obtain the latest and optimum process support, and the problems such as of poor timeliness, difficulty in updating and low intelligent level caused by the static process packet of the traditional industrial robot are avoided; and the present invention uses the cloud hardware resource to complete process knowledge storage and computation, the occupied hardware of the local controller of the industrial robot is decreased, the software architecture is simple, the cost is low and the standardization is facilitated.

DESCRIPTION OF THE DRAWINGS

The present invention will be further described below with reference to the drawings in combination with the embodiments.

DESCRIPTION OF THE EMBODIMENTS

In order to enable the technical means and innovative features realized by the present invention and the purposes and effects achieved by the present invention to be easily understood, the present invention will be described below.

Figure 1:
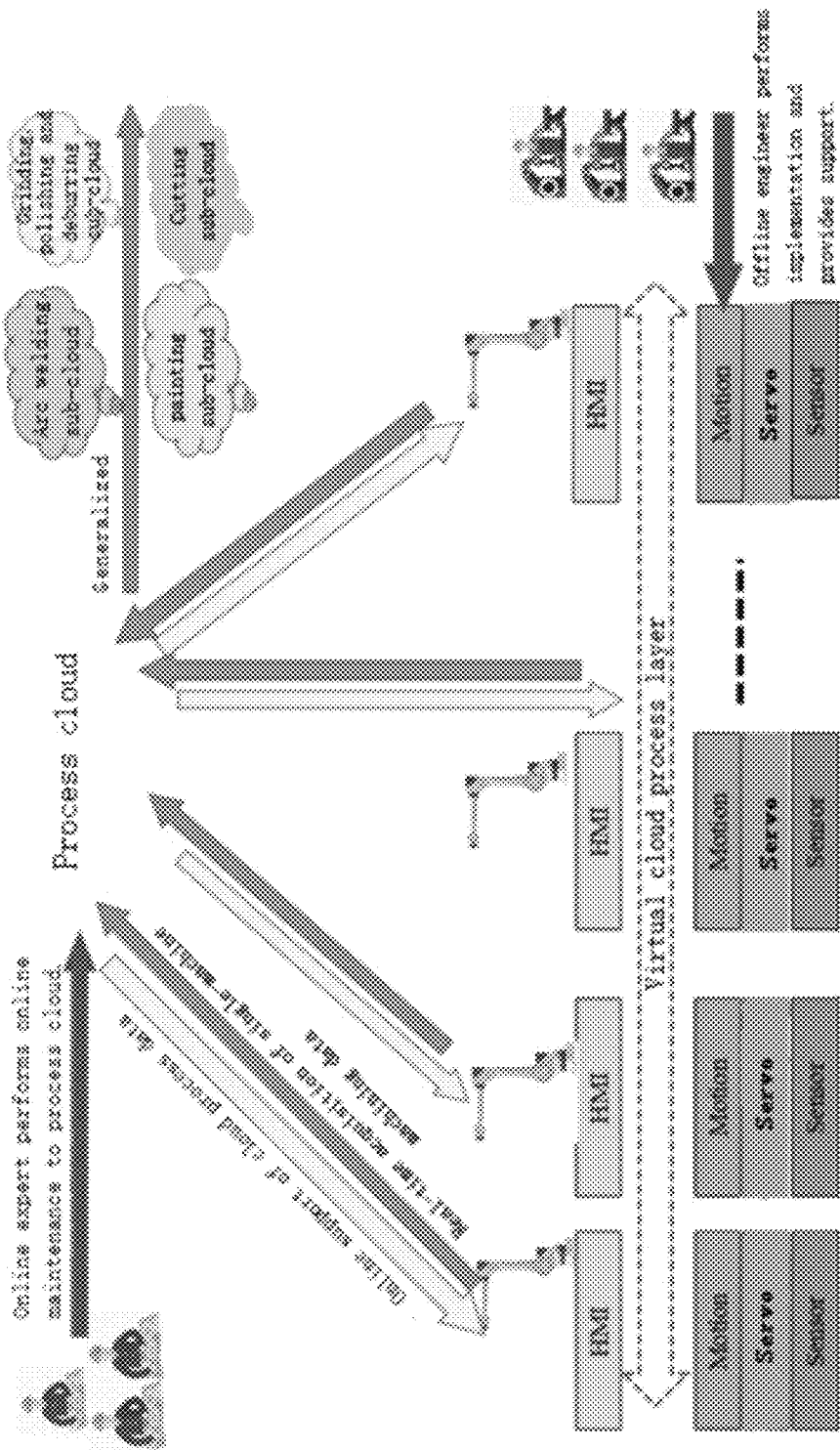
FIG. 1 illustrates a schematic principle diagram of the present invention.

As illustrated in FIG. 1, an industrial robot process cloud system comprises an industrial robot control system integrated with a human machine interaction layer HMI, a motion planning control layer Motion and a servo loop control layer Servo, and further comprises a cloud server, and the cloud server comprises a process expert system. In the present invention, by implementing relevant functions of a process software packet originally used by the traditional industrial robot by means of the process expert system which is stored and operates in the cloud server, the hardware resource of the local control system of the industrial robot is not occupied, the software architecture is simple, the cost is low, and the establishment of the intelligent and dynamic expert system is realized depending on the powerful hardware resource of the cloud server.

The human machine interaction layer HMI and the motion planning control layer Motion realize data interaction with the cloud server by means of a network via a specific data interaction communication protocol, after the human machine interaction layer HMI inputs operation information, the operation information is transmitted to the cloud server, and after the cloud server searches an existing template program in the process expert system or performs similarity comparison and reasoning computation, a specific robot operation program is generated and downloaded into the industrial robot control system by means of the network.

Robot sensors for sensing real-time data of an industrial robot is integrated in the industrial robot control system, the robot sensors comprise a motor encoder and a current sensor, final operation data during batch operation performed by the industrial robot to workpieces are transmitted to the cloud server, the final operation data also contain bottom servo control layer data, and the cloud server completes optimization, learning and evolution of the process expert system by comparing and learning from the difference between the original downloaded operation program and final operation data. The process expert system has real-time continuous learning and perfection functions and can be updated in real time, the user canalways obtain the latest process knowledge and support, the timeliness is strong, and simultaneously the hardware resource of the cloud server does not have a bottleneck of the local hardware resource. By adopting the technical solution provided by the present invention, the changeover production programming efficiency of factories can be greatly improved, it does not depend on and is not limited to experiences of industrial robot operation and maintenance personnel and process personnel of the user, and the use cost of the industrial robot is reduced.

The process expert system comprises a welding sub-cloud, a painting sub-cloud, a cutting sub-cloud, a pick and palatizing sub-cloud, an assembling sub-cloud, a gluing sub-cloud and a grinding, polishing and deburring sub-cloud, and a the number of sub-clouds can be increased continuously subsequently according to increase of operation types. In the present invention, by storing various types of machining processes in the cloud server and realizing sharing and real-time evolution and learning by means of the network, the user can conveniently call the program which best satisfies actual requirements, and the problem that the changeover production programming efficiency of the traditional industrial robot is low is solved.

The network is a 3G, 4G, 5G or the like mobile communication network or an Ethernet existing in the form of WIFI and physical connection. By adopting a common high-speed mobile communication network or Ethernet, the data interaction requirement of the present invention can be satisfied and the data transmission timeliness is guaranteed.

The present invention defines the process expert system which is based on high-speed network technology, operates in the cloud server and has learning and evolution capabilities as a process cloud, so as to cooperate with other parts of the present invention to form the industrial robot process cloud system.

Embodiment 1

Figure 2:
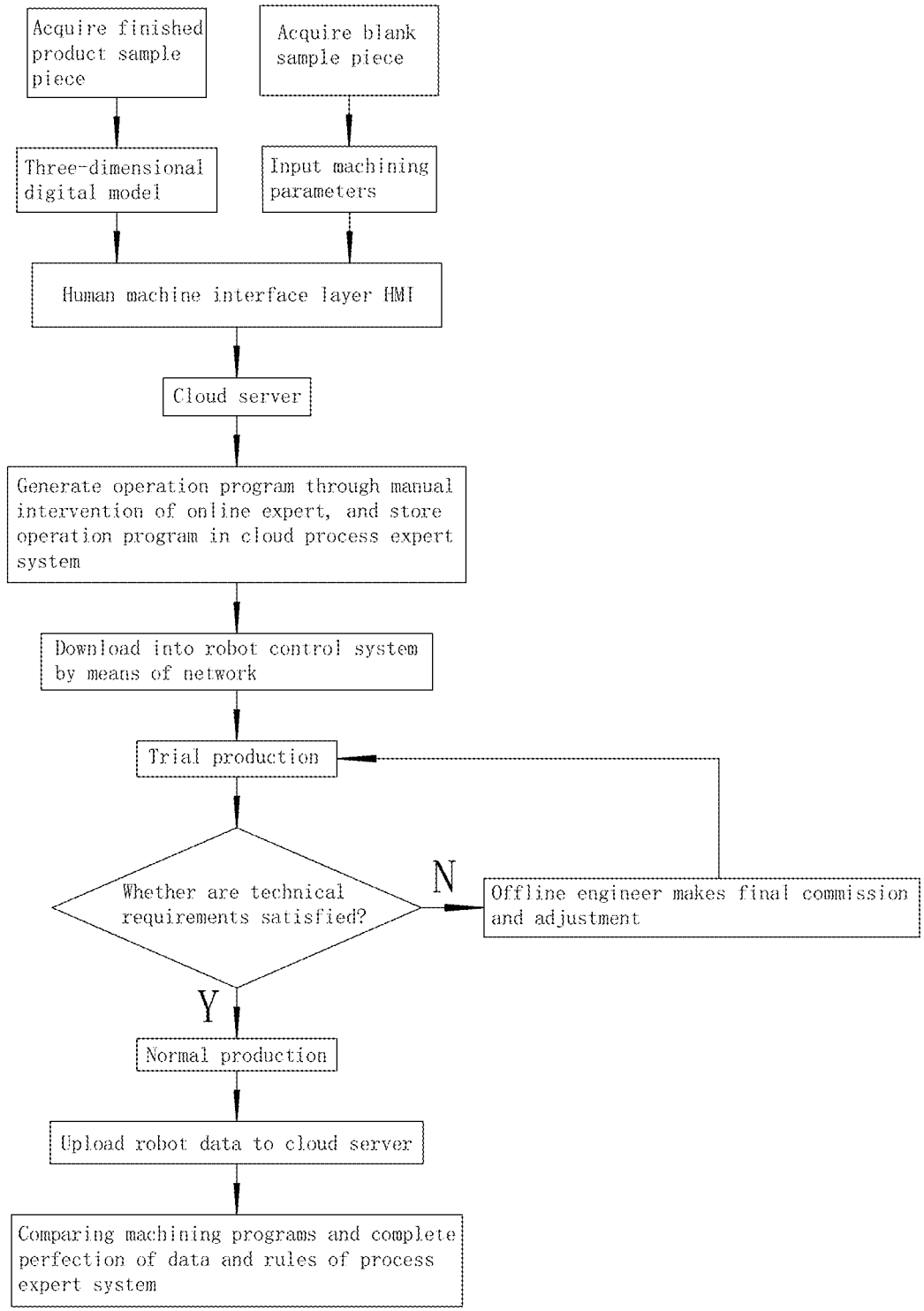
FIG. 2 illustrates a flowchart of embodiment 1 of the present invention.

As illustrated in FIG. 2, a working method of an industrial robot process cloud system comprises the following steps:
step 1: directly acquiring a three-dimensional digital model of a finished product sample piece by means of computer-aided design, or acquiring a three-dimensional digital model of a finished product sample piece by means of three-dimensional scanning, a manual input mode or an automatic inspection mode of workpiece attributes by equipment and instruments being adopted after the three-dimensional digital model of the finished product sample piece is acquired, i.e., acquiring relevant information of a blank sample piece, and inputting machining parameters through a human machine interaction layer HMI of an industrial robot, wherein the machining parameters comprise material and workpiece machining process requirements and a mode of automatically inspecting workpiece attributes by adopting equipment and instruments is a barcode reading inspection mode or an RFID reading inspection mode;
step 2: the industrial robot control system transmitting relevant data obtained in step 1 to a cloud server by using a specific communication protocol;
step 3: the cloud server generating an operation program according to workpiece information by means of online expert manual intervention and downloading the operation program into the industrial robot control system, and simultaneously storing the solution and the operation program in the process expert system;
step 4: after field engineers perform analog simulation and makes a confirmation, controlling the industrial robot to perform trail production;
step 5: inspecting a sample piece obtained after trial production to make sure that the sample piece satisfies technical requirements, and if it is inspected as unqualified, an offline engineer correcting and adjusting the operation program of the industrial robot;
step 6: performing normal production after the sample piece is inspected as qualified;
step 7: the offline engineer directly uploading data of the industrial robot entering a normal production process to the cloud server, or automatically acquiring data of the industrial robot entering a normal production process and data collected by sensors in real time and uploading the data to the cloud server by means of the network; and
step 8: comparing an original downloaded robot operation program with a robot operation program for actual normal production in the cloud server, an online engineer performing correction and supplementation to the process expert system or automatically completing perfection of data and rules of the process expert system by using intelligent algorithms such as deep learning such that the process expert system completes learning and evolution.

Embodiment 2

Figure 3:
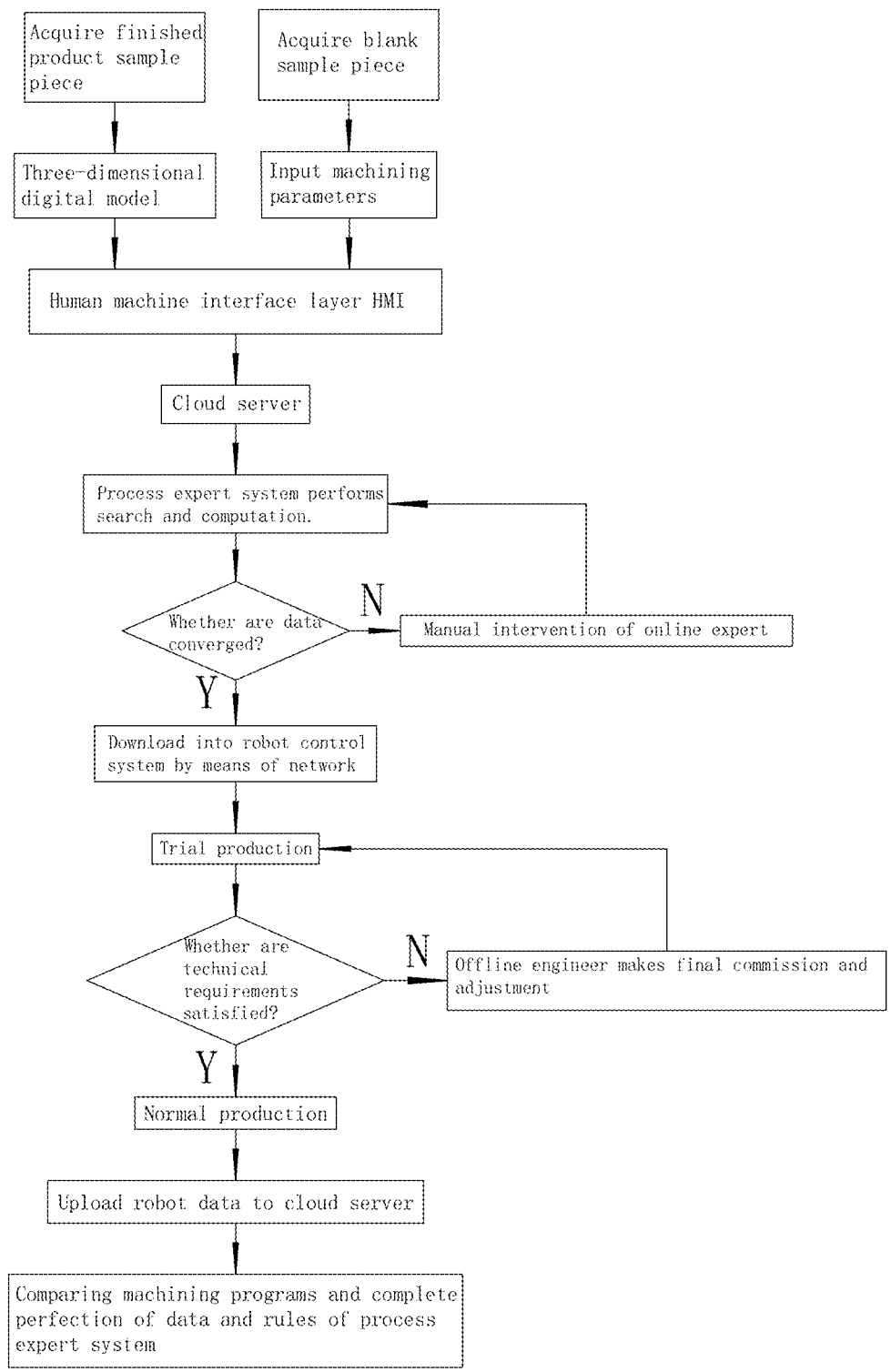
FIG. 3 illustrates a flowchart of embodiment 2 of the present invention.

As illustrated in FIG. 3, a working method of an industrial robot process cloud system comprises the following steps:
step 1: directly acquiring a three-dimensional digital model of a finished product sample piece by means of computer-aided design, or acquiring a three-dimensional digital model of a finished product sample piece by means of three-dimensional scanning, inputting the three-dimensional digital model into an industrial robot control system after the three-dimensional digital model of the finished product sample piece is acquired, a manual input mode or an automatic inspection mode of workpiece attributes by equipment and instruments being adopted, i.e., acquiring relevant information of a blank sample piece, and inputting machining parameters through a human machine interaction layer HMI of an industrial robot, wherein the machining parameters comprise material and workpiece machining process requirements and a mode of automatically inspecting workpiece attributes by adopting equipment and instruments is a barcode reading inspection mode or an RFID reading inspection mode;
step 2: the industrial robot control system transmitting relevant data obtained in step 1 to a cloud server by using a specific communication protocol;
step 3: the cloud server performing search and computation in the process expert system, judging whether search and computation are converged in real time, downloading the operation program into the industrial robot control system by means of the network if search and computation are converged, and if data are not converged, online experts manually intervening and adjusting the data, i.e., correcting the automatically searched operation program of the industrial robot, to enable the data to be converged;

step 4: after field engineers perform simulation and makes a confirmation, controlling the industrial robot to perform trail production;

step 5: inspecting a sample piece obtained after trial production to make sure that the sample piece satisfies technical requirements, and if it is inspected as unqualified, offline engineers correcting and adjusting the operation program of the industrial robot;

step 6: performing normal production after the sample piece is inspected as qualified;

step 7: the offline engineer directly uploading data of the industrial robot entering a normal production process to the cloud server, or automatically acquiring data of the industrial robot entering a normal production process and data collected by a sensor in real time and uploading the data to the cloud server by means of the network; and step 8: comparing an original downloaded robot operation program with a robot operation program for actual normal production in the cloud server, online engineers performing correction and supplementation to the process expert system or automatically completing perfection of data and rules of the process expert system by using intelligent algorithms such as deep learning such that the process expert system completes learning and evolution.

Simultaneously, the specific use situations of the present invention and the traditional industrial robot are compared, and results are as shown in the following table:

| Aspects | Traditional industrial robot | Industrial robot process cloud system |
| --- | --- | --- |
| Changeover production efficiency | Low | High |
| Dependence on skilled field engineer | Highly dependent | Not dependent |
| Operation and maintenance personal cost | High | Low |
| Process support integrity and intelligence | The local hardware resource cannot complete acquisition and mining of process data; computation and reasoning of process instructions and storage of a process knowledge database, the process support intelligence and integrity are poorer; and a bottleneck exists. | The establishment of the intelligent process expert system is realized depending on the powerful hardware resource of the cloud server; the process expert system has capabilities of continuous learning and perfection; and no bottleneck exists. |
| Process support timeliness | The process software packet needs to be periodically updated, is static and cannot be updated in real time; the user cannot use the latest and optimum function; and the timeliness is poorer. | The process expert system of the cloud server has real-time learning and updating functions; the user can always obtain the latest process support; and the timeliness is strong. |
| Software and hardware requirements of industrial robot | The occupied hardware resource is greater; a high-performance processor and a hardware platform are needed; and the software architecture is complex. | The occupied hardware resource is smaller; the software architecture is simple; the cost is lower and the standardization is facilitated. |
| control system | | |

The basic principles, major features and advantages of the present invention are shown and described above. One skilled in the art shall understand the present invention is not limited by the above-mentioned embodiments, what are described in the above-mentioned embodiments and the description are just the principles of the present invention, the present invention also has various changes and perfections without departing from the spirit and scope of the present invention, and these changes and perfections are all included in the scope of the present invention. The scope of the present invention is defined by the attached claims and equivalents thereof.

What is claimed is:

1. An industrial robot process cloud system, comprising an industrial robot control system integrated with a human machine interaction layer HMI, a motion planning control layer and a servo loop control layer Servo, wherein:
   said industrial robot process cloud system further comprises a cloud server, said cloud server comprising a process expert system;
   said human machine interaction layer HMI and said motion planning control layer realize data interaction with said cloud server by means of a network via a specific data interaction communication protocol, after said human machine interaction layer HMI inputs operation information, said operation information is transmitted to said cloud server, and after said cloud server searches an existing template program in said process expert system or performs similarity comparison and reasoning computation, a specific robot operation program is formed and downloaded into said industrial robot control system by means of said network; and
   robot sensors for sensing real-time data of an industrial robot is integrated in said industrial robot control system, final operation data during batch operation performed by said industrial robot to workpieces are transmitted to said cloud server, and said cloud server completes optimization, learning and evolution of said process expert system by comparing and learning from the difference between said original downloaded operation program and final operation data.

2. The industrial robot process cloud system according to claim 1, wherein said process expert system comprises a welding sub-cloud, a painting sub-cloud, a cutting sub-cloud, a pick and palatizing sub-cloud, an assembling sub-cloud, a gluing sub-cloud and a grinding, polishing and deburring sub-cloud, and the number of sub-clouds can be increased continuously subsequently according to increase of operation types.

3. The industrial robot process cloud system according to claim 1, wherein said network comprises wired and/or non-wired connections.

4. The industrial robot process cloud system according to claim 1, wherein said robot sensors comprise motor encoders and current sensors.

5. A working method of said industrial robot process cloud system of claim 1, wherein said working method comprises the following steps:
- step 1: acquiring a three-dimensional digital model of a finished product sample piece, inputting said three-dimensional digital model into said industrial robot control system and inputting machining parameters through said human machine interaction layer HMI of said industrial robot;
- step 2: said industrial robot control system transmitting relevant data obtained in step 1 to said cloud server by using a specific communication protocol;
- step 3: said cloud server downloading an operation program into said industrial robot control system by means of said network;
- step 4: after performing simulations and making a confirmation, controlling said industrial robot to perform trail production;
- step 5: inspecting a sample piece obtained after trial production to make sure that said sample piece meets set requirements;
- step 6: performing normal production after said sample piece is inspected as qualified;
- step 7: uploading data of said industrial robot entering a normal production process and data collected by a sensor to said cloud server by means of said network; and
- step 8: comparing an original downloaded robot operation program with a robot operation program for actual normal production in said cloud server, completing perfection of data and rules of said process expert system such that said process expert system completes learning and evolution.

6. The working method of said industrial robot process cloud system according to claim 5, wherein, in step 1, said three-dimensional digital model of said finished product sample piece is directly acquired by means of computer-aided design.

7. The working method of said industrial robot process cloud system according to claim 5, wherein, in step 1, said three-dimensional digital model of said finished product sample piece is acquired by means of three-dimensional scanning.

8. The working method of said industrial robot process cloud system according to claim 5, wherein, in step 1, said machining parameters comprise material and workpiece machining process requirements.

9. The working method of said industrial robot process cloud system according to claim 5, wherein, in step 1, said machining parameters are input by adopting a manual input mode through said human machine interaction layer HMI of said industrial robot.

10. The working method of said industrial robot process cloud system according to claim 5, wherein, in step 1, workpiece attributes are automatically inspected by adopting equipment and instruments, and said machining parameters are input through said human machine interaction layer HMI of said industrial robot.

11. The working method of said industrial robot process cloud system according to claim 10, wherein a mode of automatically inspecting workpiece attributes by adopting said equipment and said instruments is a barcode reading inspection mode.

12. The working method of said industrial robot process cloud system according to claim 10, wherein a mode of automatically inspecting workpiece attributes by adopting said equipment and said instruments is an RFID reading inspection mode.

13. The working method of said industrial robot process cloud system according to claim 5, wherein, in step 3, said cloud server generates said operation program according to workpiece information by means of online expert manual intervention and downloads said operation program into said industrial robot control system, and simultaneously a solution and said operation program are stored in said process expert system.

14. The working method of said industrial robot process cloud system according to claim 5, wherein, in step 3, said cloud server automatically performs search and computation in said process expert system, judges whether said search and said computation are converged in real time, and downloads said operation program into said industrial robot control system by means of said network if said search and said computation are converged.

15. The working method of said industrial robot process cloud system according to claim 14, wherein, in step 3, if data are not converged, said data are manually intervened and adjusted to enable said data to be converged.

16. The working method of said industrial robot process cloud system according to claim 5, wherein, in step 5, if it is inspected as unqualified, said operation program of said industrial robot is corrected and adjusted.

17. The working method of said industrial robot process cloud system according to claim 5, wherein, in step 7, said data of said industrial robot entering said normal production process are directly uploaded to said cloud server.

18. The working method of said industrial robot process cloud system according to claim 5, wherein, in step 7, said data of said industrial robot entering said normal production process and the data collected by said sensors are automatically acquired in real time and are uploaded to said cloud server by means of said network.

19. The working method of said industrial robot process cloud system according to claim 5, wherein, in step 8, correction and supplementation of said process expert system are performed by online experts to complete said perfection of said data and said rules of said process expert system such that said process expert system completes said learning and said evolution.

20. The working method of said industrial robot process cloud system according to claim 5, wherein, in step 8, said perfection of said data and said rules of said process expert system is automatically completed by using intelligent algorithms comprising deep learning such that said process expert system completes said learning and said evolution.

* * * * *